April 30, 1929.　　C. SURICO ET AL　　1,711,431
MACHINE FOR FOLDING NOODLES
Filed March 16, 1926　　4 Sheets-Sheet 2
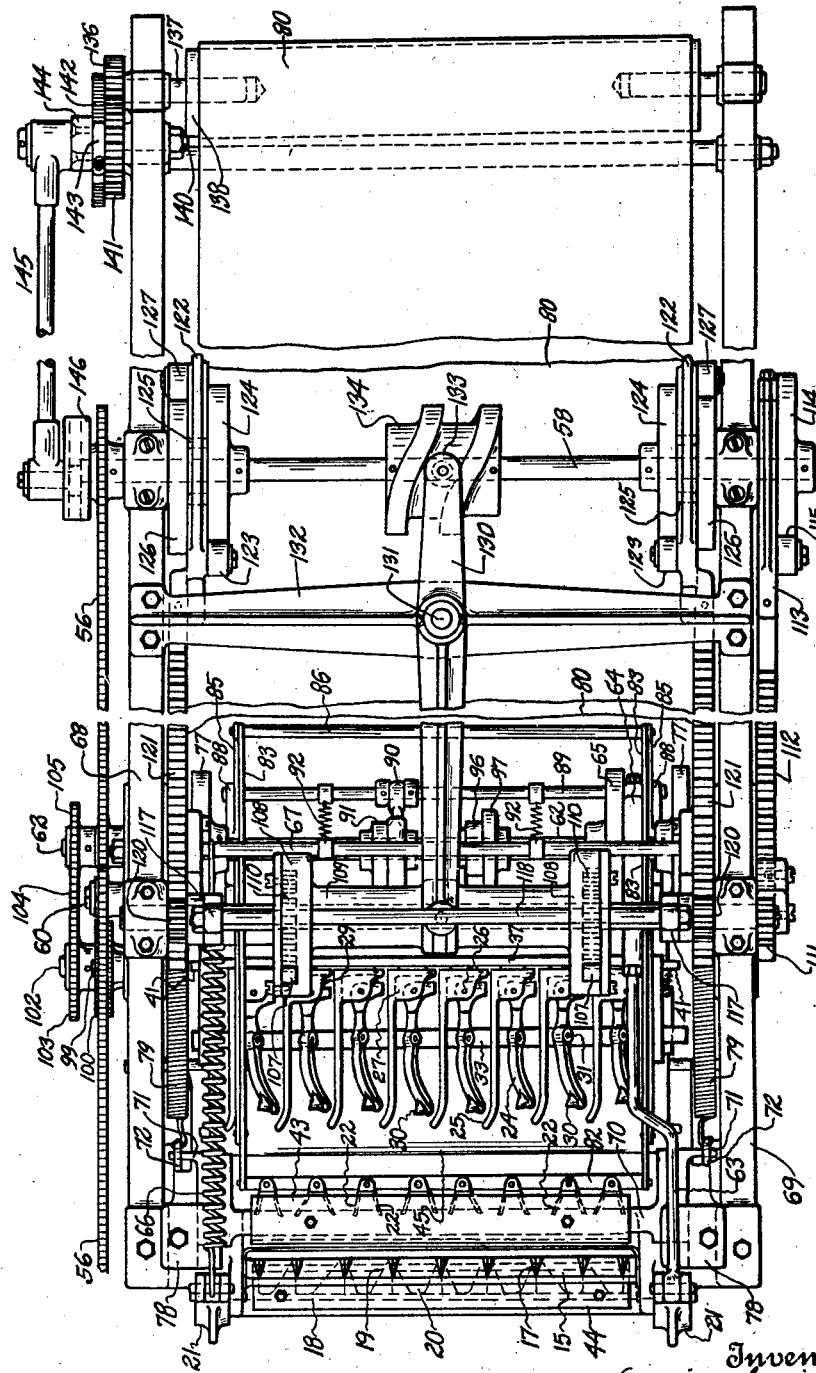

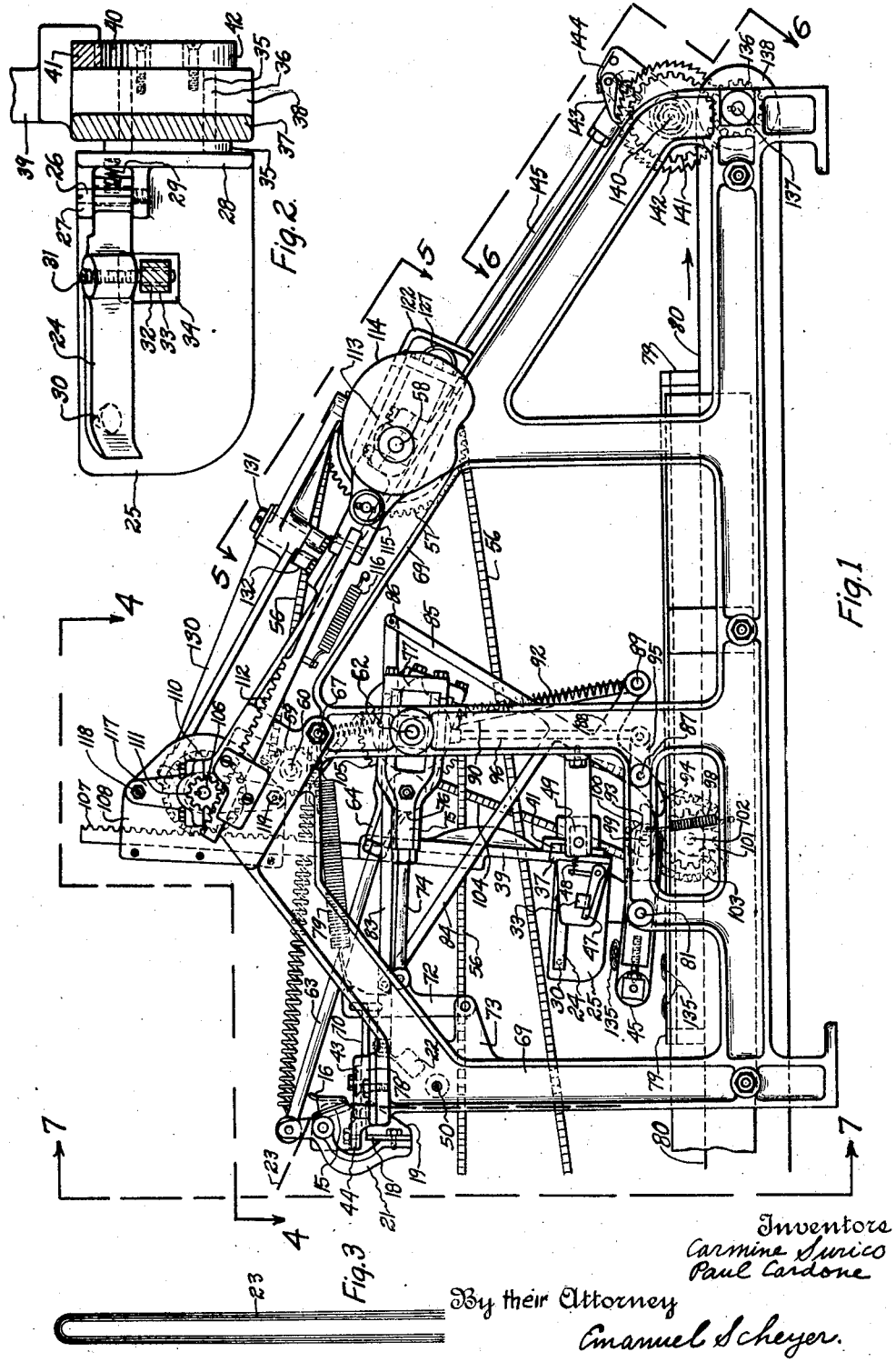

Patented Apr. 30, 1929.

1,711,431

UNITED STATES PATENT OFFICE.

CARMINE SURICO AND PAUL CARDONE, OF NEW YORK, N. Y., ASSIGNORS TO CLERMONT MACHINE CO. INC., OF NEW YORK, N. Y.

MACHINE FOR FOLDING NOODLES.

Application filed March 16, 1926. Serial No. 95,029.

This invention relates to machines for folding noodles, macaroni, vermicelli, fidellini and other related dough products.

One of its principal objects is so to handle and fold the noodles as to closely imitate the manner in which this is done by hand. The present machine is provided with means which first divide a shredded sheet of dough into separate hanging bunches. Fingers, corresponding in number to the bunches, are adapted to seize the bunches. When the fingers have seized the bunches, cutting means automatically cut off the upper ends, causing the bunches to hang in loops from the fingers. The lower ends of the loops are dragged over a receiving surface by the fingers, which gradually lower the loop thereon. During this lowering, the fingers are adapted to be given a variety of motions for twisting or folding the loops upon themselves. The fingers are mounted on a cross frame hung from brackets or arms which are adapted to be swung about a shaft as axis. In addition to this swinging motion, the brackets can be moved substantially radially with respect to their axis. Mechanism is provided also for transversely reciprocating the cross frame and brackets. Other types of mechanism for effecting substitute motions, instead of those shown, can be used and still come within the scope of the invention.

Other forms of bunches can be formed, differing from that shown and described, by varying the sequence and amounts of the motions noted above.

Broadly speaking all the folding motions do not have to be done by the fingers themselves, some or all of them, as a mechanical equivalent, can be effected by the receiving surface. Rather it is the relative motion between the fingers and the receiving surface which accomplishing the folding.

The term "noodles" is used in the specification for the sake of brevity, but it is to be understood that other related dough products are meant as well.

Other objects and advantages in addition to those noted above will become apparent upon further study of the specification and drawings in which:—

Figures 7, 8:
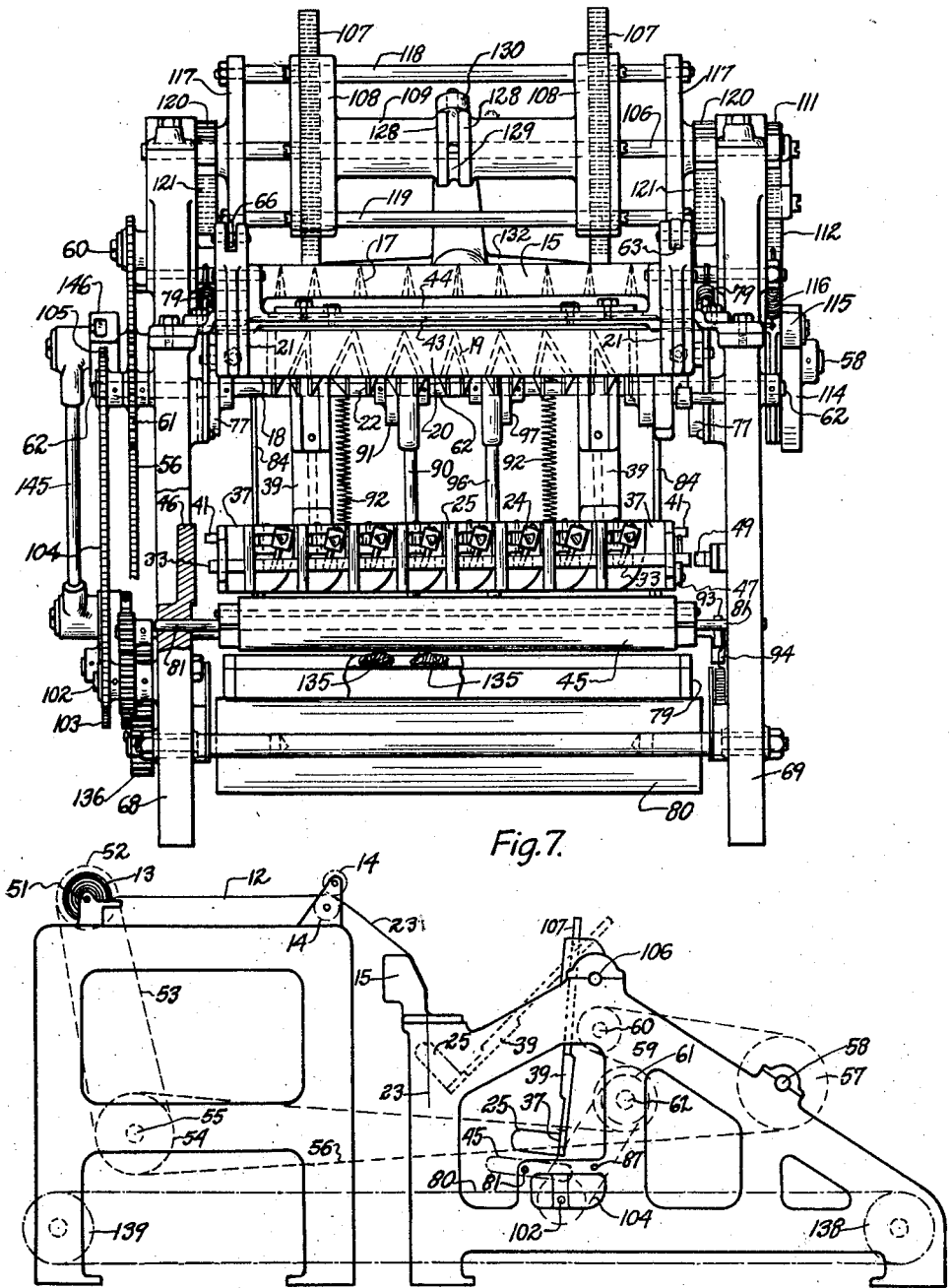
Figure 9:
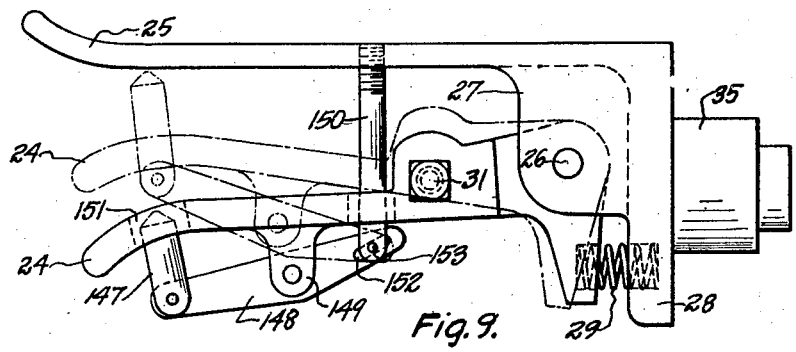
Figure 10:
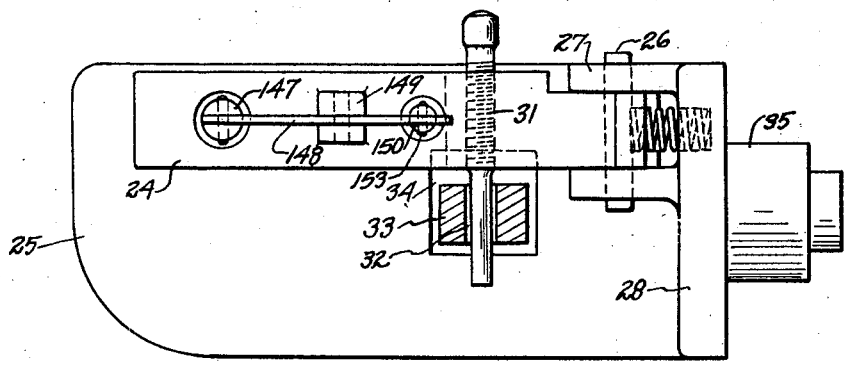
Figure 11:
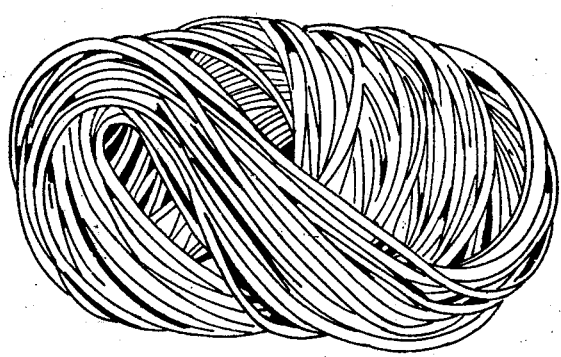
Figure 12:
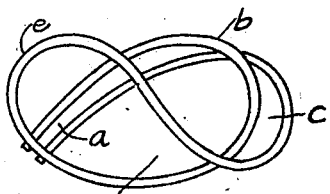

Fig. 1 is a side elevation of the noodle folding machine, Fig. 2 is an enlarged detail of the fingers for gripping the noodles, Fig. 3 is a view of the bunch of noodles just after being cut, Fig. 4 is a partial plan of the machine looking along the line 4—4 of Fig. 1, Fig. 5 is a partial plan of the machine looking along the line 5—5 of Fig. 1, Fig. 6 is a partial plan of the machine looking along the line 6—6 of Fig. 1, Fig. 7 is an end elevation of the left end of the machine, as shown in Fig. 1, with a portion of the frame broken away to show the stationary bracket for operating the fingers, Fig. 8 is a schematic elevation showing the noodle folding machine in combination with a noodle cutting machine, Fig. 9 is a plan of a modified form of finger construction, Fig. 10 is an elevation of the construction shown in Fig. 9, Fig. 11 shows the folded bunch of noodles and Fig. 12 shows the folding of an individual noodle.

The sheet of dough 12 (Fig. 8) is pulled from the roll of dough 13 and is led between cutting rolls 14 which cut it into strings or noodles as is more fully explained in our U. S. Patent No. 1,357,611, noodle cutting machines, November 2, 1920. From cutting rolls 14, the sheet of dough 12, now cut into strings or noodles 23 passes by gravity over stationary bunching bracket 15, between said bracket and guard 16 (Fig. 1). Stationary bunching bracket 15 is essentially a plate provided with wedge shaped projections 17 (Figs. 4 and 7) which together with the surface of said plate form little compartments between them, into which the strings of dough separate themselves into bunches, a bunch being formed for each compartment. In Fig. 7, projections 17 are shown dotted because they are on the far side of the plate. It is these bunches, which it is the object of the rest of the machine to fold into various forms, one of which is shown in Fig. 11.

Just below stationary bunching bracket 15 is located movable bunching plate 18. Bunching plate 18 is also provided with projections, one of which is shown at 19 (Figs. 4 and 7). These projections 19 divide movable bunching plate 18 into compartments such as shown at 20 corresponding to the compartments formed on stationary bunching bracket 15. Movable bunching plate 18 is bolted at each end to a bracket 21. Brackets 21 are pivotally mounted on the main frames 68 and 69 of the machine. Brackets 21, together with plate 18, are adapted to be rocked at predetermined intervals by mechanism described later on. Opposite each compartment 20 is a movable claw 22, best seen in Figs. 1 and 4. These claws are adapted to be rocked toward plate 18 as said plate is rocked toward them by mechanism also to be described later. The cooperation of compartments 20 and claws 22 further consolidates the bunches originally formed by stationary bunching bracket 15, and also disposes them, in spaced relation transversely to suit the folding mechanism.

The noodles 23, in Fig. 1, are shown passing over the stationary bunching bracket 15 and hanging between plate 18 and claws 22, before they have been brought together to consolidate the bunches. When the bunches have been consolidated, there results a row of spaced bunches of dough strings hanging down in the front part of the machine ready to be seized by the noodle folding fingers 24 and 25.

The fingers 24 and 25 are carried in a cross-frame hung from brackets 39. As will be explained hereafter, brackets 39 are so supported and actuated that cross-frame 37 with its fingers 24 and 25 are given a variety of motions. At the beginning of an operation said fingers are held by brackets 39, up and forward near the hanging bunches 23, so that said bunches pass between the open fingers. This position is shown dotted in Fig. 8. After fingers 24 and 25 have closed together on the bunches of noodles between them, the bunches are cut off by knife blades 43 and 44, and assume the position shown in Fig. 3, hanging from the fingers in the form of a loop with the free ends downward. The fingers are then lowered substantially to the position shown in Fig. 1 and carried about so that these free ends first drag over a depositing or receiving surface (conveyor 45) after which the rest of the loop is piled on top of itself while being carried about by further motion of the fingers so as to form a bunch 135 as shown in Fig. 11. While being carried about by cross-frame 37, fingers 24 and 25 are also given a wrist-like rotation upon said cross-frame as will be explained.

Each finger 24 is rotatably mounted on a pin 26 (Figs. 2 and 4) supported in brackets 27 formed integrally with finger 25. Each finger 25 has a flange 28 projecting at right angles from it. Between the rear end of finger 24 and flange 28 is interposed a compression spring 29 which normally tends to hold the outer end of finger 24, which carries the conical projection 30, against finger 25. Finger 24 at its intermediate portion, carries a pin 31 projecting downward from it. Pin 31 loosely engages a slot 32 in a bar 33. An opening 34 is provided in each finger 25, for the passage therethrough of bar 33. A horizontal motion of bar 33 in one direction (towards the bottom of the page in Fig. 4) rotates finger 24 about pin 26 and separates its projection 30 from finger 25, while motion of bar 33 in the opposite direction permits the closing of the fingers. Flange 28 of finger 25 has a boss 35 projecting from it. Boss 35 is rotatably mounted in bushing 36, held in cross-frame 37 to allow for the wrist-like motion mentioned above. At each bushing 36, cross-frame 37 carries a hollow boss 38 encasing said bushing to supply rigidity to the supports of fingers 25. On its right hand end (Fig. 2), each boss 35 carries fixed to it a disc 42 provided with gear teeth 40 for a portion of its upper periphery. Rack 41, slidably supported in brackets 39, is adapted to mesh with teeth 40. Horizontal motion of rack 41 rotates discs 42 and hence fingers 24 and 25.

Bar 33 and rack 41 project to the left of cross-frame 37 as shown in Fig. 7. Near the end of its motions in depositing the bunches on conveyor 45, cross-frame 37 is moved to the left (Fig. 7) causing the projecting ends of bar 33 and rack 41 to be pressed against stationary bracket 46 formed on frame 68 of the machine. This first gives the wrist-like motion to the fingers after which they are separated as rack 41 projects more to the left than bar 33. The separation of the fingers releases the bunches of noodles. The fingers are retained in separated position against the action of springs 29, by means of pawl 47 (Figs. 1 and 7) snapping up into a notch in the bottom of bar 33. Pawl 47 normally tends to assume its upper position under the tension of spring 48. A further downward motion of cross-frame 37 and a slight motion to the right, brings the right hand projecting end of rack 41 against stationary cam shaped bracket 49, causing the fingers to be rotated back to their initial position ready to seize the next batch of hanging bunches of noodles, as said fingers are moved up to position under bunching plate 18 as shown dotted in Fig. 8. When the fingers have reached the position where the hanging bunches come between them, further movement upward and forward causes pawl 47 to be tripped by having its end come under lug 50 projecting inward from the frame of the machine (Fig. 1). This releases bar 33 causing the fingers to close about the bunches between them. When the bunches are then cut by knife-blades 43 and 44, the top of the bunch falls, looping over the conical projection 30 into the form shown in Fig. 3. The plane of the loop thus formed is substantially parallel to finger 25.

The main power for the machine is obtained from shaft 51 (Fig. 8) of the noodle cutting machine, which shaft is adapted to be driven from some source of power (not shown). Sprocket wheel 52 which is fixed to shaft 51 drives chain 53. Chain 53 meshes with sprocket wheel 54 fixed to shaft 55. Shaft 55 carries fixed to it another sprocket wheel (not shown) with which chain 56 meshes. Chain 56 then passes over sprocket wheel 57 fixed to shaft 58, thence over sprocket wheel 59 fixed to shaft 60, thence over sprocket wheel 61 fixed to shaft 62 and back again to the sprocket wheel on shaft 55.

The mechanism for rocking bunching plate 18 is as follows: Bunching plate 18 is supported on brackets 21 which are rotatably mounted on the frame of the machine. Pivotally connected to one of the brackets 21 is a cam rod 63 (Figs. 1 and 4). The other end of cam rod 63 is formed with a yoke 64 carrying a roller adapted to ride on the periphery of cam 65. Cam 65 is fixed to shaft 62. The rotation of cam 65 rocks bunching plate 18 at predetermined intervals, the return stroke of said plate being effected by spring 66 fixed at one end to the bracket 21 at the top of the sheet (Fig. 4). The other end of spring 66 is fastened to cross bar 67 bolted between frames 68 and 69 of the machine near their upper portion.

The mechanism for operating the movable knife-blade 43 is as follows: Knife-blade 43 is bolted to a cross bar 70 provided with projections 71 at each end engaging slots in levers 72 (Figs. 1 and 4). The ends of cross bar 70 are adapted to slide in slotted guides 78 bolted to main frames 68 and 69. Levers 72 are pivotally mounted on brackets 73 formed on main frames 68 and 69 (Fig. 1 shows one of them). Pin connected to each lever 72 is a cam rod 74 provided with a yoke 75 carrying a cam roller 76 adapted to roll on the periphery of a cam 77. Cams 77 are fixedly mounted on shaft 62. At predetermined intervals cams 77 move knife-blade 43 to the left for cutting off the noodles. The return stroke is effected by means of springs 79 fastened at one end to levers 72 and at the other to cross bar 67.

The mechanism for operating claws 22 is as follows:—Claws 22 are mounted on a cross bar 82 (Fig. 4). Said cross bar is mounted on a frame comprising a horizontal bar 83 on each side of the machine (Figs. 1 and 4). Bars 83 are each connected to inclined bars 84 and 85, best seen in Fig. 1. Bars 83 and 85 are connected at their junction to a cross bar 86. The lower end of bars 85 are loosely mounted on shaft 87 which extends across the machine and is rotatably mounted in main frames 68 and 69. Each bar 85 has formed upon it a crank arm 88. Cross bar 89, best seen in Figs. 1 and 4, is supported at each end in a crank arm 88. Cam rod 90 is pivotally mounted at its lower end on cross bar 89. The upper end of cam rod 90 is adapted to be actuated by cam 91 (Fig. 7) fixed to shaft 62. Cam 91 is so formed that at predetermined intervals it rocks the frame-work formed of bars 83, 84, 85, 86 and 89, thereby operating claws 22 on cross bar 82. The return stroke of said frame-work is effected by springs 92 fastened at their upper ends to cross bar 67 and at their lower ends to cross bar 89.

The noodles are folded and deposited by fingers 24 and 25 upon the upper run of conveyor 45. Said conveyor is adapted to have no feeding or running motion during the time of deposit, but when a row of bunches of noodles have been deposited upon it, it is adapted to be given sufficient feeding motion to present a new surface for the deposit of the next row of bunches. The completed bunches are fed off the front end of conveyor 45 and drop upon a tray 79 below, carried by another conveyor 80. Conveyor 45 is an endless belt mounted as is usual upon a pair of rollers. The belt as a whole with its rollers is pivotally mounted at its center upon a cross bar 81 (Figs. 1, 7 and 8). When the belt 45 is rotated so that its rear end (right Figs. 1 and 8) is down it is caused to have feeding motion. When the rear end is lifted no feeding motion takes place as will be explained.

The mechanism for operating conveyor belt 45 is as follows:—One side of the frame for conveyor 45 is provided with a lug 93 (Figs. 1 and 7) fixed to it. Opposite lug 93 and adapted to engage with it, is a finger 94 fixed to a shaft 87. Fixed to shaft 87, near its middle portion, is a crank 95. Cam rod 96 is pivotally connected at its lower end to crank 95 while its upper end is adapted to be reciprocated by cam 97 (Figs. 4 and 7), that is cam 97 forcibly depresses cam rod 96 causing finger 94 to raise lug 93 against the tension of spring 98 thereby raising the rear end of conveyor 45 in which position it is caused to have no running or feeding motion. Spring 98, which is fastened at its upper end to lug 93 and at its lower end to main frame 69, normally holds the rear end of conveyor 45 down. Shaft 99, upon which the rear roller of conveyor 45 is fixedly mounted, carries gear 100 fixed to it. When the rear end of conveyor 45 is down gear 100 meshes with gear 101 fixed to shaft 102 thereby causing conveyor 45 to have its running or feeding motion. Sprocket wheel 103 is fixed to the end of shaft 102. Chain 104 at the lower end of its run meshes with sprocket wheel 103 while the upper end of its run engages sprocket wheel 105, fixed to shaft 62 by which it is driven. It is to be recalled that shaft 62 is driven by the main driving chain 56 which meshes with sprocket wheel 61 fixed to the end of said shaft.

Cross frame 37, which supports fingers 24 and 25, is adapted to be given a variety of motions for folding the noodles upon conveyor 45. The mechanisms for effecting these motions will now be explained.

The mechanism for raising and lowering the fingers 24 and 25 with a motion of pure translation will now be explained. This motion is one which increases or decreases the distance of said fingers from shaft 106 from which they are suspended by suitable framing to be described:—Cross frame 37 is fastened to the lower end of brackets 39. The upper end of brackets 39 each carry a rack 107 fixed to them. Each rack 107 is slidably mounted in a housing 108 attached to the ends of sleeve 109. Sleeve 109 is loosely mounted on shaft 106. Each rack 107 is adapted to engage a gear 110 carried in housing 108. The housings 108 are provided with cavities within which gears 110 are rotatably mounted. Gears 110 are also feathered upon shaft 106, permitting of their being slid transversely on said shaft together with sleeve 109 and housings 108 for a purpose to be explained later. Shaft 106 is rotated by gear 111 fixed to its right end (Fig. 7). Rack 112 (see also Figs. 1 and 4) meshes with gear 111 and drives it. The rear end of rack 112 is provided wth yoke 113 adapted to slide over a block (not shown) loosely mounted on shaft 58. Fixedly mounted on shaft 58 adjacent to yoke 113 is cam 114 with which cam roller 115 engages. Cam roller 115 is rotatably mounted on yoke 113. Cam 114 is suitably formed to move rack 112 forward at predetermined intervals, the return stroke of said rack being effected by spring 116. The reciprocation of rack 112 raises and lowers cross frame 37 and with it fingers 24 and 25 through the train of mechanism just described.

The mechanism for swinging or rotating fingers 24 and 25 about shaft 106 as axis is as follows:—As noted above sleeve 109 is loosely mounted on shaft 106. Brackets 117 are also loosely mounted on shaft 106. A tie rod 118 connects the upper ends of brackets 117 to each other (best seen in Fig. 7). In a similar manner a tie rod 119 connects the lower ends of said brackets to each other. Both tie rods 118 and 119 pass through housings 108 carried by sleeve 109. When brackets 117 are rotated, housings 108 therefore are rotated with them. A gear 120 (Figs. 4 and 7) is fixedly mounted on each bracket 117. Said gears are loose on shaft 106. Each gear 120 meshes with a rack 121 by which it is adapted to be driven. The other ends of racks 121 each carry a yoke 122, which is adapted to slide over a square bearing block 125 (Fig. 5) loosely mounted on shaft 58 between cams 124 and 126. A pair of cams 124 and 126 are fixed upon shaft 58 near each end. Each yoke 122 carries a cam roller 123 adapted to ride on cam 124 and a cam roller 127 adapted to ride on cam 126. The rotation of cams 124 is adapted to push racks 121 to the left (Fig. 5) while cams 126 are adapted to pull said racks to the right. When racks 121 are moved to the right, gears 120 which are fixed to brackets 117 rotate the latter so as to cause housings 108 to swing cross frame 37 downward and with it fingers 24 and 25. Motion of racks 121 to the left swings cross frame 37 upward.

Fingers 24 and 25 with their supporting bracket 37 are also adapted to be given a reciprocating transverse motion. The mechanism for effecting this is as follows:—Sleeve 109 which is rotatably and slidably mounted on shaft 106 carries near its middle portion collars 128 between which ring 129 is rotatably mounted, best seen in Fig. 7. Lever 130 which is pivotally mounted on pin 131, held by cross frame 132, (Fig. 5) is pivotally connected at one end to ring 129. The other end of lever 130 has cam roller 133 rotatably mounted upon it. Cam roller 133 works in the groove of cam 134 fixed to shaft 58, said groove being so formed as to rock the end of lever 130 and thereby cause the transverse motion of bracket 37 with its fingers in predetermined relation to the other motions described above.

When the noodles 23 have been completely folded they appear as bunches 135 shown on conveyor 45 (Figs. 1 and 7). At predetermined intervals bunches 135 are discharged upon tray 79 (Fig. 1). Tray 79 is carried by conveyor 80. Conveyor 80 is adapted to be given an intermittent motion, so as to receive bunches 135 in rows from conveyor 45.

The mechanism for effecting the intermittent motion of conveyor 80 in the direction of the arrow in Fig. 1 is as follows:—Gear 136 is fixed to short shaft 137 supporting one end of the rear roller 138 over which belt 80 runs (Figs. 1, 6, 7 and 8). The forward end of belt 80 passes over roller 139 (Fig. 8). Rotatably mounted on short shaft 140 just above gear 136 and meshing with it is gear 141, which carries fixed to it ratchet wheel 142. Pawl 143 carried by bracket 144 is adapted to engage ratchet wheel 142. Bracket 144 is rotatably mounted on short shaft 140. One end of pitman 145 is pin connected to bracket 144 while the other end is adapted to engage crank 146 fixed to the end of shaft 58. The rotation of crank 146 causes pitman 145 on its up stroke, through the agency of bracket 144 and pawl 143, to give ratchet wheel 142 a partial rotation. This partially rotates gear 141 and with it gear 136 resulting in belt 80 being shifted to a new position.

The operation of the machine is as follows:—The shredded sheet of dough is led from the noodle cutting rolls 14 over stationary bunching bracket 15 coming on down between movable bunching plate 18 and claws 22. Cams 65 and 91 operate, respectively movable bunching plate 18 and claws 22 to come together and consolidate the shredded dough sheet into bunches. Cross frame 37 at this time is raised to its upper and forward position so that the bunches of noodles hang between the pairs of fingers 24 and 25, which are separated. Said fingers embrace the bunches at the point where they (the fingers) are held when cross frame 37 is just about to come up to the position where lug 50 will disengage pawl 47 from the notch in the end of bar 33. A slight further upward motion of cross frame 37 disengages said pawl, permitting fingers 24 to come against fingers 25 under the action of springs 29 (Figs. 2 and 4) and grip the bunches. At about this time cam 77 actuates movable knife-blade 43 to cut the upper ends of the bunches. The upper ends of said bunches fall over lug 30 causing them to hang between fingers 24 and 25 in loops as shown in Fig. 3, with the plane of the loop parallel to the face of fingers 25. Cross frame 37, with its fingers, is now moved downward so that the ends of the loops touch the top of conveyor 45. This downward motion is effected through the agency of cam 114 operating racks 107 so as to move them downward while at the same time cross frame 37 is swung down about shaft 111 as axis by racks 121. The motion of racks 121 is controlled from cams 124 and 125. Referring now to Figs. 11 and 12, cross frame 37 is so moved transversely and longitudinally backward that portion a of the loop is deposited on conveyor 45. In addition to its transverse and longitudinal motion cams 114, 124 and 125 continue to bring down cross frame 37 so as to supply sufficient length of noodle for the deposit. The transverse motion is effected effected through the swinging of lever 130 by cam 134 while the backward longitudinal motion is supplied by the swinging of cross frame 37 about shaft 111. Transverse and longitudinal motion is further effected, while at the same time racks 107 come down, so that portion b is now deposited. The transverse motion is reversed towards the end of portion b. Portion c is then deposited, the longitudinal motion being forward towards the latter portion of c. Finally the portions d and e are deposited. During the deposit of portion e, rack 41 comes against bracket 46 (Fig. 7) giving a wrist like rotation to fingers 24 and 25 for more effectively dropping off the head of the loop. When cross frame 37 approaches its extreme left position (Fig. 7) in depositing the portion e, bar 33 comes against bracket 46, separating fingers 24 from fingers 25 and releasing the loop. During all this depositing operation conveyer 45 remained stationary, with its right or rear end (Fig. 1) raised, separating gears 100 and 101. When the deposit is completed, cam 97 releases the rear end of conveyor 45 permitting springs 98 to hold it down for a sufficient length of time to feed off the folded bunches 135 upon tray 79. The cycle of operations is repeated for further depositing of noodles.

Instead of constructing fingers 24 and 25 as shown in Fig. 2, we prefer to make them as shown in Figs. 9 and 10. The fingers in the latter figures are shown removed from cross frame 37, boss 35 being shown with its necked down portion for the mounting thereon of disc 42 as previously explained. It has been found that there is a tendency for the noodles to stick to the conical projection 30 (Fig. 2) of finger 24. In order to overcome this movable pin 147 (Figs. 9 and 10) is substituted. Finger 24 carries a bracket 149 upon which is rotatably mounted lever 148. Pin 147 is pin connected to the forward end of lever 148. The rear end of lever 148 is provided with a slot 152 adapted to engage a small pin 153 mounted near the end of rod 150. Rod 150 is fixedly connected to finger 25. When fingers 24 and 25 are separated by the action of bar 33, lever 148 and pin 147 assume the position shown in solid lines in Fig. 9. When finger 24 approaches finger 25 for gripping the noodles, the rear end of lever 148 being restrained by rod 150, pin 147 is caused to pass through hole 151 in finger 24 until it touches finger 25. When the fingers are separated, the withdrawal of pin 147 through hole 151 scrapes off the noodles hanging from said pin.

We claim:—

1. In a noodle-folding machine, a plurality of devices adapted to take hold of a plurality of corresponding bunches of noodles, each device comprising a pair of fingers relatively rotatable to and from each other and adapted to permit their corresponding bunch to enter between them, a finger of each pair being provided with a member suitably mounted to pass through said finger toward the other finger of the pair when said fingers have relative rotation to each other, and to be withdrawn from said former finger when said fingers have relative rotation from each other.

2. A noodle-folding machine of the character described, having means for consolidating a suspended sheet of noodles into separate hanging bunches comprising oppositely movable members adapted to have the sheet of noodles hang between them, said members having oppositely disposed compartments adapted when moved toward each other to consolidate the noodles into separate bunches between them.

3. A noodle-folding machine as claimed in claim 2, in which the compartments of one of the oppositely movable members consist of a plurality of spaced claws.

4. A noodle-folding machine as claimed in claim 2, in which the compartments of one of the oppositely movable members consist of a plurality of spaced depressions formed in said member.

5. In a noodle-folding machine, means for grasping at an an intermediate point a plurality of separate bunches of hanging noodles, said means being swingably mounted and movable transversely along the axis of said swinging, a surface for receiving said bunches from the grasping means and mechanism for swinging said grasping means to said hanging bunches for grasping same and then moving said grasping means transversely and swinging them over said receiving surface, said motions effecting the folding of the bunches on the receiving surface.

6. A noodle-folding machine comprising means for taking hold of a plurality of bunches of noodles, said holding means being rotatably mounted whereby they can be swung to and from said bunches, said holding means being in addition adapted to be moved to and from their axis of rotation, and mechanism for swinging said holding means about their axis and for varying their distance from same in predetermined timed relation.

7. A noodle-folding machine comprising means for taking hold of a plurality of bunches of noodles, bracket construction for supporting near one end said holding means, said bracket construction being rotatably mounted near its other end, said mounting permitting said holding means to be moved nearer and farther with respect to the axis of rotation of said bracket construction, and mechanism for rotating said bracket construction and for varying the distance between said holding means and said axis in predetermined timed relation.

8. A noodle-folding machine comprising means for taking hold of a plurality of bunches of noodles, bracket construction for supporting near one end said holding means, a rotatably mounted member for supporting said bracket construction near its other end, said member being adapted to permit said bracket construction to move with respect to it whereby the distance of the holding means from the axis of rotation of said member can be varied, and mechanism for rotating said member and for varying the distance of the holding means with respect to said member in timed relation.

9. A noodle-folding machine comprising means for taking hold of a plurality of bunches of noodles, said holding means being rotatably mounted, whereby they can be swung to and from said bunches, said holding means being in addition adapted to be moved to and from their axis of rotation and to be moved in an axial direction transversely of the machine, and mechanism for swinging said holding means about their axis, for varying their distance from same and for effecting their transverse motion in predetermined timed relation.

10. A noodle-folding machine comprising means for taking hold of a plurality of bunches of noodles, a surface for receiving said bunches from the holding means, said holding means being rotatably mounted whereby they can be swung to and from said receiving surface, said holding means being in addition adapted to be moved to and from their axis of rotation, said holding means and said receiving surface being suitably supported whereby they can be given relative transverse motion with respect to each other, and mechanism for swinging said holding means about their axis, for varying their distance from same, and for effecting said relative transverse motion in predetermined timed relation.

11. A noodle-folding machine comprising means for taking hold of at an intermediate point a plurality of separate bunches of noodles, a conveyor for receiving said bunches from the holding means, mechanism for effecting relative motion between said holding means and the conveyor and the running of the conveyor in predetermined timed relation whereby said bunches are folded upon the conveyor, another conveyor situated below said former conveyor adapted to receive the folded bunches from said former conveyor, said latter conveyor adapted to be given intermittent motion in timed relation to the motion of said former conveyor.

12. In a noodle-folding machine, a pivotally mounted conveyor adapted to have noodles folded upon it, mechanism for folding the noodles upon said conveyor, said conveyor adapted when rotated to one position about its axis to be given a running motion and when rotated to another position to remain stationary and mechanism for effecting the operation of the noodle folding mechanism and the rotation of the conveyor in timed relation.

13. A noodle-folding machine as claimed in claim 12 in which the conveyor is in the form of an endless belt mounted upon a pair of rollers held in a frame, said frame being pivotally mounted at an intermediate point.

14. A noodle-folding machine comprising means for grasping a plurality of separate bunches of noodles at an intermediate point, a conveyor for receiving the bunches from the holding means and mechanism for effecting relative transverse reciprocation between said means and the conveyor and the running of the conveyor in timed relation, said mechanism also effecting said grasping action in timed relation to said reciprocation.

15. A noodle-folding machine as claimed in claim 10 in which the receiving surface is in the form of a conveyor adapted to be run intermittently in timed relation to the motions of said holding means.

16. In a noodle-folding machine a plurality of pairs of fingers adapted to hold a plurality of bunches of noodles, the fingers of a pair being relatively rotatable to and from each other, and in addition each pair being rotatably mounted about an axis at an angle to their relative rotation for adapting each pair to be given a wrist-like rotation.

17. In a noodle-folding machine a plurality of devices for grasping a plurality of separate bunches of noodles, each device being rotatably mounted adapting it to be given a wrist-like rotation in addition to its grasping action, and mechanism for effecting said wrist-like motion in timed relation to said grasping action.

18. In a noodle-folding machine, a plurality of devices for taking hold of a plurality of bunches of noodles at an intermediate point in their length, a surface for receiving said bunches from the holding devices, said devices being rotatably mounted adapting them to be given a wrist-like motion and mechanism for effecting relative motion between said receiving surface and the holding devices, said mechanism also effecting said wrist-like motion in timed relation to said relative motion whereby the bunches are folded upon the receiving surface.

19. A noodle-folding machine as claimed in claim 18 in which the mechanism for effecting the wrist-like rotation of the holding devices is adapted to effect said rotation towards the end of their relative motion with the receiving surface.

20. A noodle-folding machine, comprising means adapted to receive and divide into a plurality of spaced bunches a sheet of noodles having relative motion with respect to said means lengthwise of the noodles, mechanism for cutting off said bunches after a predetermined amount of said relative motion, a surface upon which the bunches are folded, a plurality of devices for taking hold of said bunches from the spacing means and depositing them on said surface, and means for effecting relative reciprocatory transverse and relative reciprocatory longitudinal motions between said surface and the holding devices during the deposit of said bunches on said surface, said latter motions effecting the folding of the bunches upon the surface.

21. A noodle-folding machine, comprising means adapted to receive and divide into a plurality of spaced bunches, a sheet of noodles fed to said means in the direction of the length of the noodles, said sheet of noodles feeding past said means from above and being converted by said means into bunches hanging from one end below, a surface upon which the bunches are folded, mechanism for cutting off said bunches after a predetermined length has been fed, means for grasping said hanging bunches at an intermediate point in their length before being cut, said grasping means depositing the cut off bunches on said surface, and means for effecting relative reciprocatory transverse and relative reciprocatory longitudinal motions between said surface and the grasping means during the deposit of said bunches on said surface, said latter motions effecting the folding of the bunches upon said surface.

22. In a noodle-folding machine, a plurality of devices adapted to take hold of a plurality of corresponding bunches of noodles hanging from one end, each device comprising a pair of fingers relatively rotatable to and from each other and adapted to permit their corresponding bunch to enter between them, a finger of each pair being provided with a member adapted to project toward the other finger of the pair, the other finger of each pair comprising a smooth surface presented toward said member, said surface being of relatively large area with respect to said member, whereby when the bunches are cut near their upper ends, they will fall in loops over said members.

23. In a noodle-folding machine, means for receiving a suspended sheet of noodles and dividing said sheet into a plurality of separate hanging bunches, means for taking hold of said bunches at an intermediate point at predetermined intervals, cutting mechanism for cutting off said bunches near their upper ends in predetermined relation to the action of the holding means whereby said bunches are caused to hang in loops from the holding means, a surface for receiving said bunches from the holding means, and means for effecting at intervals relative vertical motion between said receiving surface and the holding means for decreasing the distance between them, said means also effecting relative reciprocatory transverse motion between said surface and the holding means during the interval of decreasing distance, said motions effecting the folding of the bunches upon the receiving surface.

24. In a noodle-folding machine, means for receiving a suspended sheet of noodles and dividing said sheet into a plurality of separate hanging bunches, means for taking hold of said bunches at an intermediate point at predetermined intervals, cutting mechanism for cutting off said bunches near their upper ends in predetermined relation to the action of the holding means whereby said bunches are caused to hang in loops from the holding means, a surface for receiving said bunches from the holding means, and means for effecting at intervals relative vertical motion between said receiving surface and the holding means for decreasing the distance between them, said means also effecting relative reciprocatory longitudinal motion between said surface and the holding means during the interval of decreasing distance, said motions effecting the folding of the bunches upon the receiving surface.

25. In a noodle-folding machine, a plurality of devices adapted to take hold of a plurality of corresponding bunches of noodles, each device comprising a pair of fingers adapted to permit their corresponding bunch to enter between them, one of the fingers of a pair of being pivotally mounted upon the other finger of the pair, said latter finger being rotatably mounted about an axis substantially at right angles to the pivotal axis of said former finger for adapting said pairs to be given a wrist-like rotation.

26. A noodle-folding machine comprising means for taking hold of at an intermediate point a plurality of bunches of noodles, a conveyor for receiving upon its surface said bunches from the holding means, means for supporting said holding means, and mechanism for varying the distance between said holding means and its supporting means whereby said bunches are moved with respect to the surface of the conveyor for folding them thereon, and mechanism for intermittently running the conveyor in timed relation to the motions of said holding means.

27. In a spaghetti folding machine, a folding finger for taking hold of a bunch of spaghetti strips, a receiving table for engaging the lower ends of the strips as they hang from the finger and are being lowered, and cam-operated means to oscillate said finger vertically and in two horizontal directions at right angles to one another to lower and fold the spaghetti strips into a predetermined figure.

28. In a spaghetti folding machine, a folding finger in the form of a pair of jaws for taking hold of the bunch of spaghetti strips, a receiving table for engaging the lower ends of the strips as they hang from the finger and are being lowered thereby, a cam-operated means to oscillate said finger vertically and in two horizontal directions at right angles to one another to lower and fold the spaghetti strips into a predetermined form, and other cam-operated means for opening and closing the jaws.

Signed at Brooklyn, New York, in the county of Kings, and State of New York, this 12th day of March A. D. 1926.

CARMINE SURICO.
PAUL CARDONE.